United States Patent
Green

(10) Patent No.: US 10,968,606 B2
(45) Date of Patent: Apr. 6, 2021

(54) YAW ESTIMATION

(71) Applicant: Caterpillar Trimble Control Technologies LLC, Dayton, OH (US)

(72) Inventor: Francisco R. Green, New Carlisle, OH (US)

(73) Assignee: Caterpillar Trimble Control Technologies LLC, Dayton, OH (US)

( * ) Notice: Subject to any disclaimer, the term of this patent is extended or adjusted under 35 U.S.C. 154(b) by 192 days.

(21) Appl. No.: 16/213,095

(22) Filed: Dec. 7, 2018

(65) Prior Publication Data

US 2020/0181884 A1 Jun. 11, 2020

(51) Int. Cl.
- E02F 9/26 (2006.01)
- E02F 3/76 (2006.01)
- G01C 19/00 (2013.01)

(52) U.S. Cl.
CPC ............ E02F 9/264 (2013.01); E02F 3/7613 (2013.01); E02F 3/7618 (2013.01); G01C 19/00 (2013.01)

(58) Field of Classification Search
CPC ........................................................ E02F 9/264
See application file for complete search history.

(56) References Cited

U.S. PATENT DOCUMENTS

| | | | |
|---|---|---|---|
| 8,924,098 B2 | 12/2014 | Zhdanov et al. | |
| 8,944,177 B2 * | 2/2015 | Guynn | E02F 3/658 172/799.5 |
| 9,279,235 B1 * | 3/2016 | Becicka | G01S 19/14 |
| 9,328,479 B1 * | 5/2016 | Rausch | E02F 3/847 |
| 9,347,205 B2 | 5/2016 | Kosarev et al. | |
| 9,428,885 B2 * | 8/2016 | Nau | E02F 9/265 |
| 9,551,130 B2 * | 1/2017 | Hendron | E02F 3/7618 |
| 9,567,731 B2 * | 2/2017 | Darukhanavala | G07C 5/0841 |
| 9,580,104 B2 * | 2/2017 | Green | B62D 11/001 |
| 9,598,844 B1 * | 3/2017 | Zhang | E02F 1/00 |
| 9,624,643 B2 * | 4/2017 | Hendron | E02F 3/845 |
| 9,624,650 B2 * | 4/2017 | Stratton | E02F 9/265 |
| 9,752,300 B2 * | 9/2017 | Chang | E02F 3/844 |
| 9,988,787 B1 * | 6/2018 | Wang | G01S 19/49 |
| 10,287,745 B1 * | 5/2019 | Keigley | E02F 3/844 |
| 2009/0033322 A1 * | 2/2009 | Ono | F16C 19/522 324/207.25 |
| 2012/0059554 A1 | 3/2012 | Omelchenko et al. | |
| 2016/0230367 A1 | 8/2016 | Hendron et al. | |

FOREIGN PATENT DOCUMENTS

GB 2559662 A * 8/2018 ............ E02F 9/262

OTHER PUBLICATIONS

"Topcon Introduces Next Generation Machine Control," Livermore, California, Feb. 3, 2016, 2 pages, downloaded May 15, 2017 from https://www.topconpositioning.com/insights/topcon-introduces-next-generation-machine-control.

International Search Report and Written Opinion for Application No. PCT/US2019/063341, dated May 28, 2020, 12 pages.

* cited by examiner

Primary Examiner — Alex C Dunn
(74) Attorney, Agent, or Firm — Kilpatrick Townsend & Stockton

(57) ABSTRACT

Methods and systems are described for estimating yaw of an implement relative to a machine. The yaw is estimated using gyro signals. The gyro signals may be provided by gyro sensors such as IMUs that are coupled to the implement and machine.

19 Claims, 6 Drawing Sheets

YAW ESTIMATION

FIELD OF INVENTION

Embodiments described herein related generally to yaw estimation and, in specific embodiments, to yaw estimation of a dozer blade relative to a dozer or relative to a c-frame coupled to the dozer.

BACKGROUND

Earthmoving machines, such as dozers (bulldozers), motor graders, loaders, and the like, typically utilize hydraulically controlled implements, such as blades or buckets, to move or pick up dirt or other materials. Sometimes these earthmoving machines include various types of sensors mounted to a body of the machine and/or to the implement to determine an absolute or relative position and/or orientation of the implement. Depending on the type of machine and implement, the orientation may include yaw, pitch, and/or roll. Improved methods and systems are desired for determining the position and/or orientation of these implements.

SUMMARY

Embodiments described herein provide improved methods and systems for estimating yaw of an implement relative to a machine. The yaw is estimated using gyro signals. The gyro signals may be provided by gyro sensors coupled to the machine (e.g., an earthmoving machine such as a dozer) and gyro sensors coupled to the implement (e.g., a dozer blade). The gyro signals can be used to estimate a relative orientation between the gyro sensors and thus a relative yaw of the implement.

In accordance with a particular embodiment, for example, a method for estimating yaw of a dozer blade coupled to a dozer by a c-frame, where the dozer blade is rotatable to change the yaw of the dozer blade relative to the c-frame, includes receiving an estimated pitch and roll of the dozer blade, receiving an estimated pitch and roll of the c-frame, and moving the c-frame to simultaneously rotate an inertial measurement unit (IMU) coupled to the dozer blade and an IMU coupled to the c-frame. Measurement axes of the IMU coupled to the dozer blade and measurement axes of the IMU coupled to the c-frame may be approximately aligned. The method also includes receiving gyro signals of the IMU coupled to the dozer blade, and receiving gyro signals of the IMU coupled to the c-frame. At least some of the gyro signals of the IMU coupled to the dozer blade may include signals obtained while the c-frame is moving and the yaw of the dozer blade is substantially static, and at least some of the gyro signals of the IMU coupled to the c-frame may include signals obtained while the c-frame is moving. The method also includes reducing effects of the estimated pitch and roll of the dozer blade on the gyro signals of the IMU coupled to the dozer blade to provide corrected dozer blade gyro signals, reducing effects of the estimated pitch and roll of the c-frame on the gyro signals of the IMU coupled to the c-frame to provide corrected c-frame gyro signals, and estimating the yaw of the dozer blade relative to the c-frame based on the corrected dozer blade gyro signals and the corrected c-frame gyro signals.

In an embodiment, the pitch and roll of the dozer blade is estimated using the IMU coupled to the dozer blade, and the pitch and roll of the c-frame is estimated using the IMU coupled to the c-frame.

In another embodiment, at least one of the pitch and roll of the dozer blade or the pitch and roll of the c-frame are estimated without using signals from an IMU.

In another embodiment, the yaw of the dozer blade relative to the c-frame is estimated using Euler angles.

In another embodiment, the method also includes rotating the dozer blade to change the yaw of the dozer blade, receiving gyro signals of the IMU coupled to the dozer blade while the dozer blade is rotating, and estimating the yaw of the dozer blade relative to the c-frame based on the gyro signals received while the dozer blade is rotating.

In another embodiment, the gyro signals of the IMU coupled to the dozer blade and the gyro signals of the IMU coupled to the c-frame provide information on angular velocity of the dozer blade and angular velocity of the c-frame respectively in Cartesian reference frames.

In another embodiment, the measurement axes of the IMU coupled to the dozer blade and the measurement axes of the IMU coupled to the c-frame each include an axis associated with pitch and an axis associated with roll, and the gyro signals of the IMU coupled to the dozer blade and the gyro signals of the IMU coupled to the c-frame provide information on angular velocity associated with the pitch and angular velocity associated with the roll.

In another embodiment, the measurement axes of the IMU coupled to the dozer blade and the measurement axes of the IMU coupled to the c-frame each include an axis associated with pitch, an axis associated with roll, and an axis associated with yaw, and the yaw of the dozer blade relative to the c-frame is estimated using gyro signals associated with the pitch and gyro signals associated with the roll without using gyro signals associated with the yaw.

In yet another embodiment, the effects of the estimated pitch and roll of the dozer blade are reduced by mapping the gyro signals of the IMU coupled to the dozer blade to an approximately level plane.

In accordance with another embodiment, a system for estimating yaw of an implement coupled to a machine, where the implement is rotatable to change the yaw of the implement relative to the machine, includes a first gyro sensor coupled to the implement, a second gyro sensor coupled to the machine. The machine is configured so that movement of at least a portion of the machine simultaneously changes at least one of a pitch of the first gyro sensor and a pitch of the second gyro sensor or a roll of the first gyro sensor and a roll of the second gyro sensor. The sensor also includes a computer system communicatively coupled to the first gyro sensor and to the second gyro sensor. The computer system is configured to receive gyro signals of the first gyro sensor and receive gyro signals of the second gyro sensor. At least some of the gyro signals of the first gyro sensor include signals obtained while at least the portion of the machine is moving and the yaw of the implement is substantially static, and at least some of the gyro signals of the second gyro sensor include signals obtained while at least the portion of the machine is moving. The computer system is also configured to estimate the yaw of the implement relative to the machine based on the gyro signals of the first gyro sensor and the gyro signals of the second gyro sensor.

In an embodiment, the computer system is also configured to reduce effects of an estimated pitch and roll of the implement on the gyro signals of the first gyro sensor to provide first corrected gyro signals, and reduce effects of an estimated pitch and roll of the machine on the gyro signals of the second gyro sensor to provide second corrected gyro signals. The gyro signals of the first gyro sensor used to estimate the yaw of the implement relative to the machine may be the first corrected gyro signals, and the gyro signals of the second gyro sensor used to estimate the yaw of the implement relative to the machine may be the second corrected gyro signals.

In another embodiment, the implement is a dozer blade and the machine is a dozer that includes a c-frame coupled to the dozer blade, and wherein the second gyro sensor is coupled to the c-frame.

In another embodiment, measurement axes of the first gyro sensor and measurement axes of the second gyro sensor are approximately aligned.

In yet another embodiment, the first gyro sensor is coupled to the implement at a known orientation relative to the second gyro sensor coupled to the machine.

In accordance with yet another embodiment, a method for estimating yaw of first gyro sensors relative to second gyro sensors, where the first gyro sensors and the second gyro sensors are mounted on separate bodies having a semi-rigid coupling so that a change in pitch or roll of the second gyro sensors results in a corresponding change in pitch or roll of the first gyro sensors, and the first gyro sensors are rotatable to change the yaw of the first gyro sensors relative to the second gyro sensors, includes moving the second gyro sensors to simultaneously change at least one of the pitch of the first gyro sensors and the pitch of the second gyro sensors or the roll of the first gyro sensors and the roll of the second gyro sensors. The method also includes receiving first gyro signals of the first gyro sensors and receiving second gyro signals of the second gyro sensors. At least some of the first gyro signals include signals obtained while the first gyro sensors and the second gyro sensors are moving and the yaw of the first gyro sensors is substantially static, and at least some of the second gyro signals include signals obtained while the first gyro sensors and the second gyro sensors are moving. The method also includes estimating the yaw of the first gyro sensors relative to the second gyro sensors based on the first gyro signals and the second gyro signals.

In an embodiment, measurement axes of the first gyro sensors and measurement axes of the second gyro sensors are approximately aligned.

In another embodiment, the method also includes receiving an estimated pitch and roll of the first gyro sensors, receiving an estimated pitch and roll of the second gyro sensors, reducing effects of the estimated pitch and roll of the first gyro sensors on the first gyro signals to provide first corrected gyro signals, and reducing effects of the estimated pitch and roll of the second gyro sensors on the second gyro signals to provide second corrected gyro signals. The first gyro signals used to estimate the yaw may be the first corrected gyro signals, and the second gyro signals used to estimate the yaw may be the second corrected gyro signals.

In another embodiment, the pitch and roll of the first gyro sensors are estimated using a first IMU and the pitch and roll of the second gyro sensors are estimated using a second IMU.

In yet another embodiment, the first gyro sensors are mounted to an implement and the second gyro sensors are mounted on a machine.

Numerous benefits are achieved using embodiments described herein over conventional techniques. Some embodiments, for example, estimate relative yaw of a dozer blade using gyro signals from inertial measurement units (IMUs). One IMU may be coupled to the dozer blade, and another IMU may be coupled to a c-frame of a dozer. The IMUs provide dependable measurements and are more robust than conventional systems that use position sensors on masts that are attached to the dozer blade. Also, using signals from gyros of the IMUs, rather than using signals from accelerometers of the IMUs, simplifies the estimation process because centers of rotation of the dozer blade and dozer are not required. Also, compared to conventional systems that use accelerations from the IMUs, the gyro signals are not as susceptible to disturbances from centripetal or tangential accelerations. Depending on the embodiment, one or more of these features and/or benefits may exist. These and other benefits are described throughout the specification with reference to the appended drawings.

BRIEF DESCRIPTION OF THE DRAWINGS

The accompanying drawings, which are included to provide a further understanding of the embodiments described herein, are incorporated in and constitute a part of this specification, illustrate embodiments of the invention, and together with the detailed description, serve to explain the principles of the various embodiments. No attempt is made to show structural details in more detail than may be necessary for a fundamental understanding of the embodiments and various ways in which they may be practiced.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION

Methods and systems are described for estimating yaw of an implement relative to a machine. The yaw is estimated using gyro signals. The gyro signals may be provided by gyro sensors such as IMUs that are coupled to the implement and machine.

Figure 1:
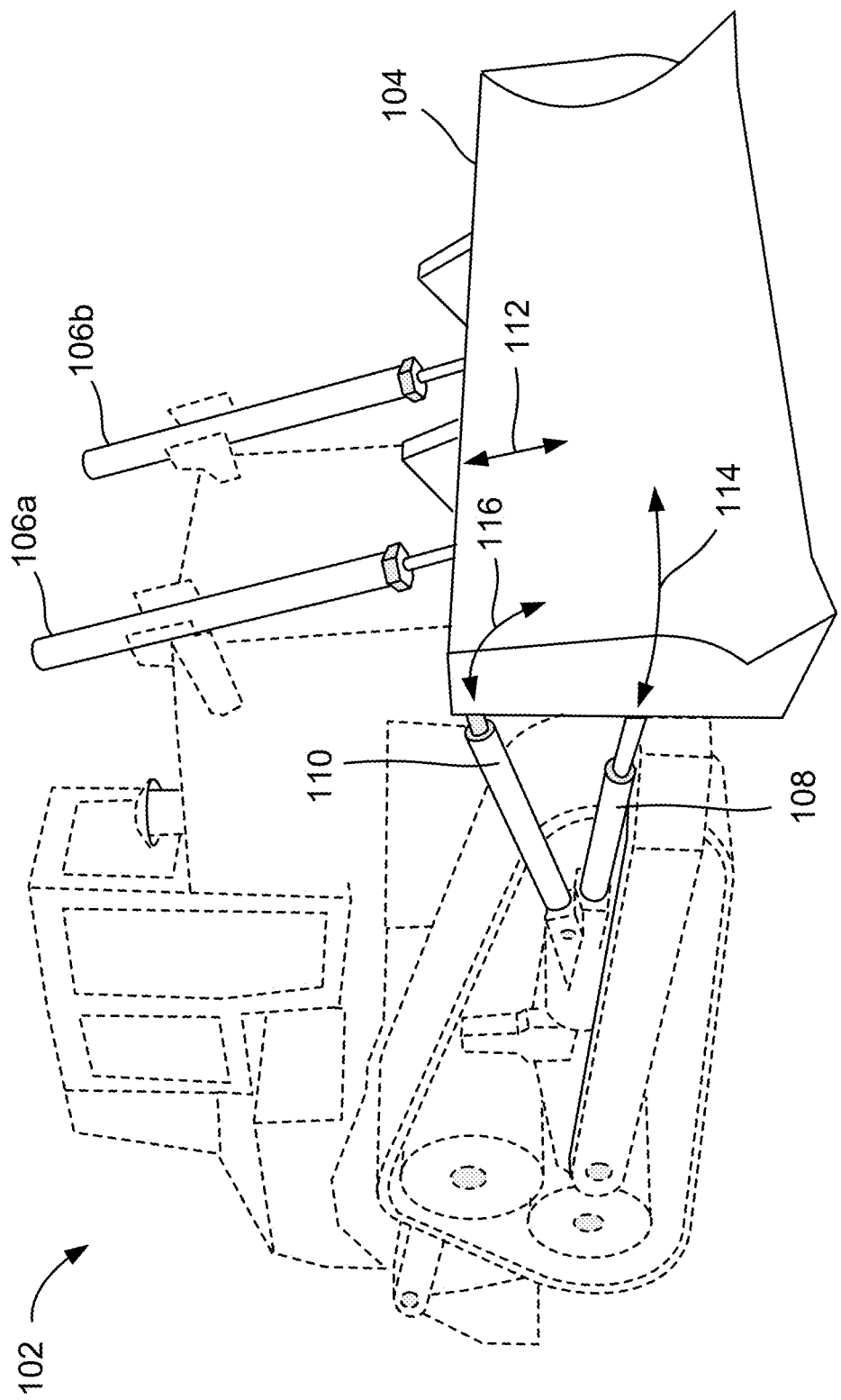
FIG. 1 is a simplified perspective view of a dozer illustrating rotation of a dozer blade in three dimensions.

FIG. 1 is a simplified perspective view of a dozer illustrating rotation of a dozer blade in three dimensions. It should be appreciated that a dozer (e.g., bulldozer) and dozer blade are used in this specification as examples of separate bodies that have a semi-rigid coupling between them. The coupling is semi-rigid in that the bodies can move relative to each other but they can also be fixed at a given orientation. The dozer and dozer blade are also used as examples of bodies that may benefit from the embodiments described herein. The embodiments described herein are not, however, limited to the dozer and dozer blade examples and may be utilized with any rigid bodies having a semi-rigid coupling between them. The rigid bodies may be referred to generally in some parts of this specification as machines (e.g., dozers) and implements (e.g., dozer blades). Some examples of semi-rigid couplings used on construction or earthmoving equipment include c-frames, angle c-frames, push anus, L-shaped push arms, and the like.

FIG. 1 shows a dozer 102 having a dozer blade 104. The dozer blade 104 is coupled to the dozer 102 by a semi-rigid coupling (not shown). A height 112 of the dozer blade 104 is adjustable using hydraulic cylinders 106a, 106b, a yaw 114 of the dozer blade 104 is adjustable using hydraulic cylinder 108, and a tilt (or pitch) 116 of the dozer blade 104 is adjustable using hydraulic cylinder 110. The dozer 102 will typically have additional hydraulic cylinders that are not visible in this figure. For example, the dozer 102 may include additional hydraulic cylinders that are coupled to the far side of the dozer blade 104 in this figure and correspond to hydraulic cylinders 108, 110.

The dozer 102 in this example is a track-type tractor (TTT) with an enclosed cab for an operator. The tracks, cab, and body are shown in dotted lines so as to not distract from the dozer blade 104 and movement of the dozer blade 104 in three dimensions. They are also shown in dotted lines because any number of machines may be used in place of the dozer 102 shown in this example.

The hydraulic cylinders shown in this example allow a position and orientation of the dozer blade 104 to be adjusted. Conventional dozers have myriad configurations, and the methods and systems described herein may be used with dozers having fewer hydraulic cylinders and/or different configurations compared to this example. For example, some dozers provide a manually adjustable coupling about one or more axes while providing a hydraulically adjustable coupling about other axes. The embodiments described herein may be used with these different configurations as well as many other machine and implement combinations.

Figure 2:
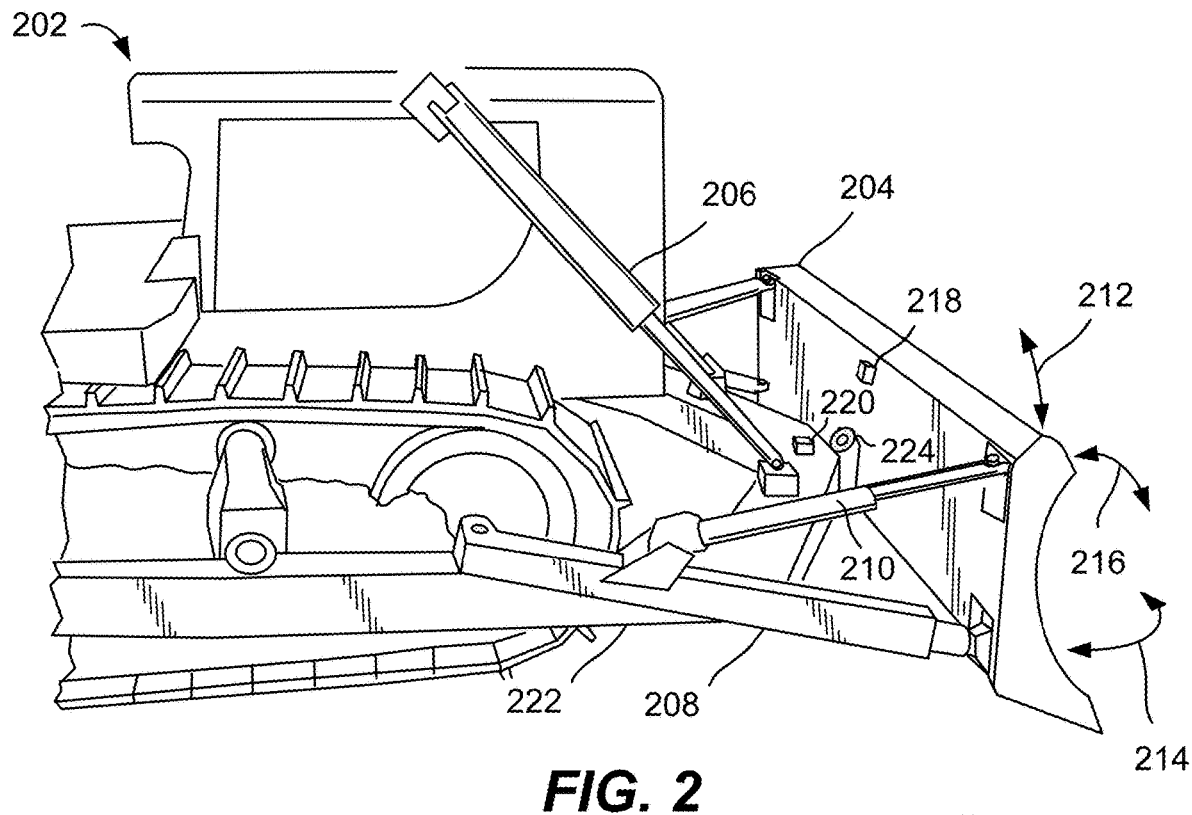
FIG. 2 is a simplified side perspective view of a part of a dozer illustrating rotation of a dozer blade in three dimensions in accordance with an embodiment.

FIG. 2 is a simplified side perspective view of a part of a dozer illustrating rotation of a dozer blade in three dimensions in accordance with an embodiment. This example shows a front part of a dozer 202 having a dozer blade 204. The dozer blade 204 is coupled to the dozer 202 by a semi-rigid coupling 224. A height 212 of the dozer blade 204 is adjustable using hydraulic cylinder 206, a yaw 214 of the dozer blade 204 is adjustable using hydraulic cylinder 208, and a tilt (or pitch) 216 of the dozer blade 204 is adjustable using hydraulic cylinder 210.

This example also shows a c-frame 222. The c-frame attaches to the dozer 202 and allows different implements, such as the dozer blade 204, to be coupled to the dozer 202 (or to the dozer 202 via the c-frame 222). The dozer blade 204 in this example is coupled to c-frame 222 by the semi-rigid coupling 224. Although the c-frame 222 may be attached to or detached from the dozer 202 in most conventional configurations, the c-frame 222 may be considered to be part of the dozer 202 in some examples described in this specification.

As can be appreciated with reference to FIG. 2, the height 212 of the dozer blade 204 can be adjusted by lifting or lowering the c-frame 222. The c-frame 222 moves up and down with the dozer blade 204. This is unlike the yaw 214 and tilt 216 of the dozer blade 204 that may be adjusted independent of the c-frame 222.

FIG. 2 also shows an IMU 218 coupled to the dozer blade 204 and an IMU 220 coupled to the dozer 202 (or to the c-frame 222 in this example). While IMUs may include many different types of sensors, they typically include at least one of accelerometers or gyroscopes. Some IMUs also include magnetometers. The accelerometers are used to measure specific force, the gyroscopes are used to measure angular velocity, and the magnetometers are used to measure the magnetic field. The accelerometers and gyroscopes may provide measurements in one, two, or three dimensions. An IMU providing accelerometer measurements in three dimensions and gyroscope measurements in three dimensions provides measurements of all six degrees of freedom (DOF) of a body in space—three components of translation and three components of rotation. The IMUs generally provide measurements in Cartesian reference frames.

For purposes of this specification, and IMU is a sensor that includes gyroscopes or other sensors configured to measure angular velocity in at least two dimensions. IMUs having gyroscopes configured to measure in three dimensions as well as other sensors may also be used.

Figure 3:
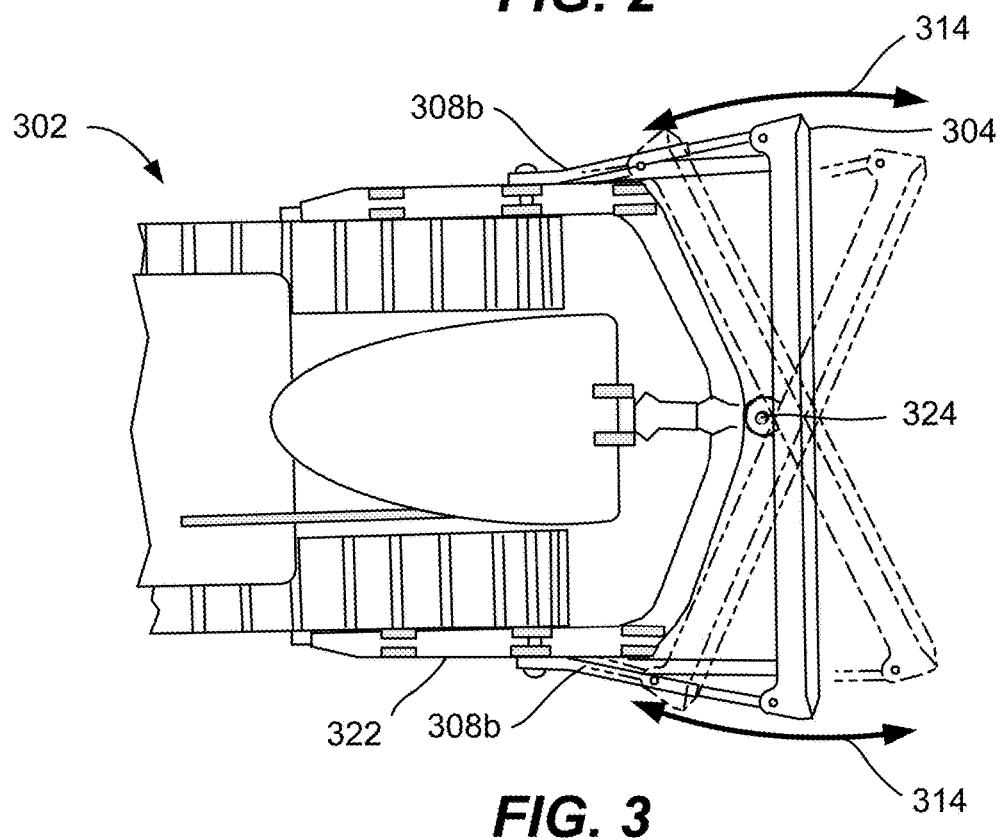
FIG. 3 is a simplified top view of a part of a dozer illustrating changes in yaw of a dozer blade.

FIG. 3 is a simplified top view of a part of a dozer illustrating changes in yaw of a dozer blade. This example shows a front part of a dozer 302 having a dozer blade 304. The dozer blade 304 is coupled to the dozer 302 by a semi-rigid coupling 324. A yaw 314 of the dozer blade 304 is adjustable using hydraulic cylinders 308a, 308b. This example does not show other hydraulic cylinders for adjusting height and tilt of the dozer blade 304.

The dozer 302 in this example also includes a c-frame 322. The dozer blade 304 is coupled to c-frame 322 by the semi-rigid coupling 324. The dozer blades shown in dotted lines in this example illustrate the change in yaw 314 of the dozer blade 304 relative to the dozer 302 (or relative to the c-frame 322). This example does not separately show the IMUs coupled to the dozer blade 304 or to the dozer 302.

Figure 4A:
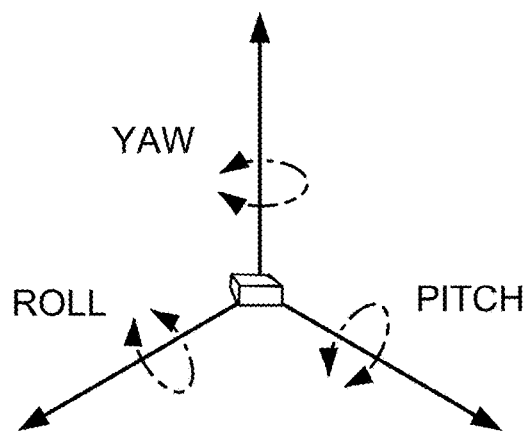
FIGS. 4A-4B are simplified drawings showing measurement axes of a sensor coupled to a dozer and measurement axes of a sensor coupled to a dozer blade in accordance with an embodiment.
Figure 4A:
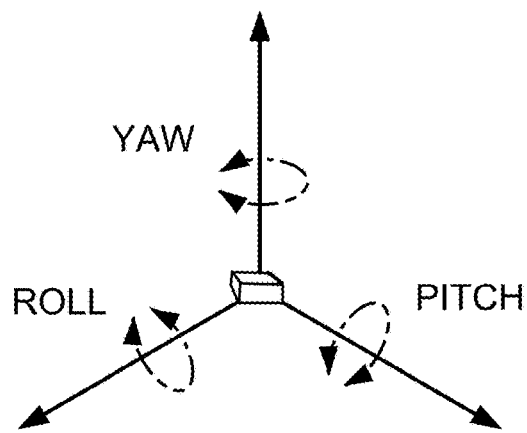
Figure 4B:
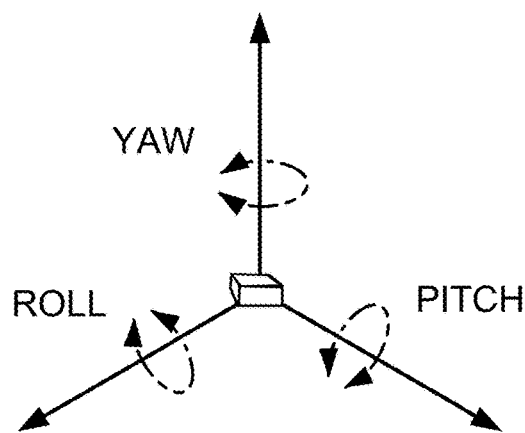
Figure 4B:
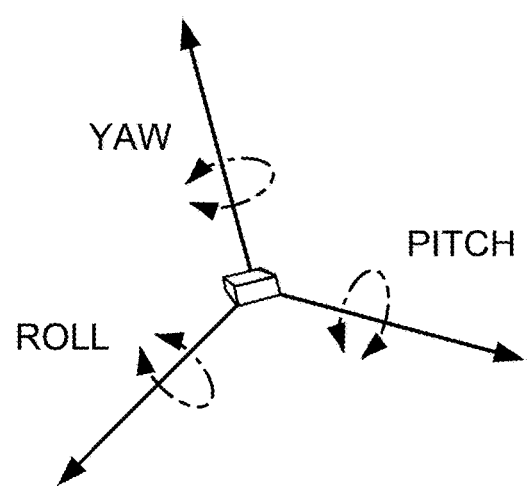

FIGS. 4A-4B are simplified drawings showing measurement axes of a sensor coupled to a dozer and measurement axes of a sensor coupled to a dozer blade in accordance with an embodiment. With reference to the previous figures, the dozer and the dozer blade may each be rotatable about one or more of the measurement axes. In general, rotation of the dozer about any of the axes (yaw, pitch, and roll) causes a corresponding rotation of the dozer blade about the same axes. The dozer blade, however, may be independently rotatable about one of more of these axes depending on the particular configuration. For example, the yaw of the dozer blade may be changed as shown in FIG. 3, and the pitch of the dozer blade may be changed by adjusting the tilt. In some configurations, the roll of the dozer blade may also be changed by lifting one side of the dozer blade relative to the other.

The sensors shown in these figures may be IMUs or other sensors configured to provide at least gyroscope measurements (e.g., angular velocity). In FIG. 4A, the measurement axes of the sensor coupled to the dozer is approximately aligned with the measurement axes of the sensor coupled to the dozer blade. The measurement axes of the sensors may be considered to be aligned if each axis is within a few degrees of the corresponding axis at a particular height, tilt, and yaw of the dozer blade. The degree to which the measurement axes are out of alignment can be used to determine the orientation of the dozer blade relative to the dozer.

In FIG. 4B, the measurement axes of the sensor coupled to the dozer is not aligned with the measurement axes of the sensor coupled to the dozer blade. This scenario may exist when an orientation of the dozer blade is adjusted, for example, to perform some task such as moving dirt or debris. The difference in alignment between the sensors can be used to determine the orientation of the dozer blade relative to the dozer.

Alternatively, the scenario illustrated in FIG. 4B may represent a mis-alignment between the measurement axes of the sensor coupled to the dozer and the measurement axes of the sensor coupled to the dozer blade. As long as the degree of mis-alignment between the sensors is known, it can be taken into account in accordance with known techniques when determining the orientation of the dozer blade relative to the dozer.

Figure 5:
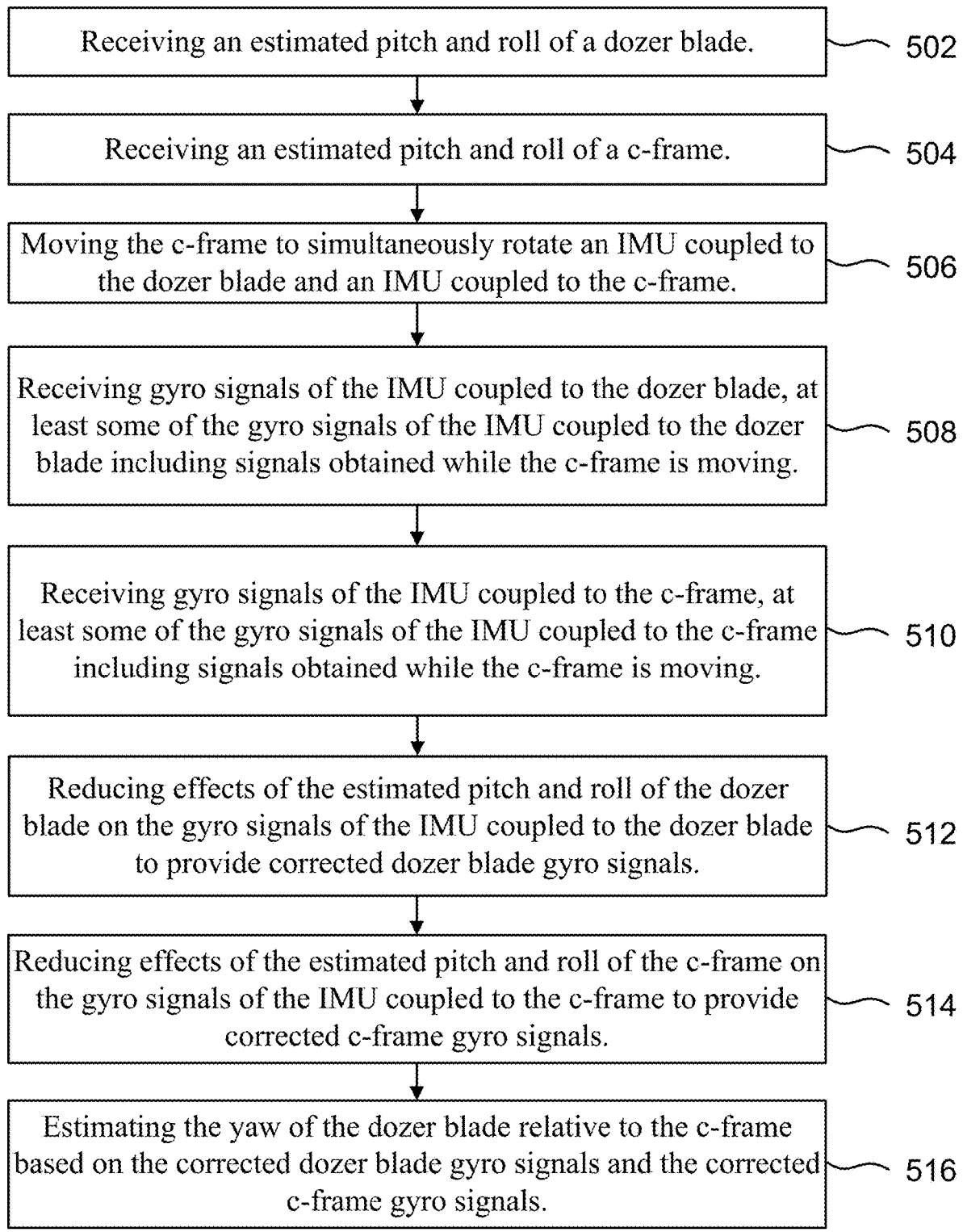
FIG. 5 is a flowchart of an exemplary method for estimating yaw of a dozer blade coupled to a dozer by a c-frame in accordance with an embodiment.

FIG. 5 is a flowchart of an exemplary method for estimating yaw of a dozer blade coupled to a dozer by a c-frame in accordance with an embodiment. The dozer blade is rotatable to change the yaw of the dozer blade relative to the c-frame (or relative to the dozer). The method may include receiving an estimated pitch and roll of the dozer blade (502), and receiving an estimated pitch and roll of the c-frame (504). Some embodiments improve accuracy by taking into account effects of the pitch and roll of the dozer blade and the pitch and roll of the c-frame on gyro signals. This will be described more fully below with regard to steps (512) and (514) of this method. The pitch and roll may be determined using IMUs coupled to the dozer blade and c-frame or by other known techniques such as using optical systems.

The method also includes moving the c-frame to simultaneously rotate the IMU coupled to the dozer blade and the IMU coupled to the c-frame (506). The yaw of the dozer blade is substantially static (or not changing) during the movement. Of course there may be some vibration or jitter in the yaw anytime the dozer is moving. This can occur without intentionally changing the yaw of the dozer blade. In some embodiments, measurement axes of the IMU coupled to the dozer blade and measurement axes of the IMU coupled to the c-frame are approximately aligned. The measurement axes may not be aligned during actually measurements, but they may be aligned at some reference orientation of the dozer blade relative to the c-frame. If the measurement axes are not aligned at some reference orientation, any difference in alignment at the reference orientation can be taken into account in accordance with known techniques in determining the yaw of the dozer blade using the methods and systems described herein.

As can be appreciated with reference to FIG. 2, the c-frame 222 may be raised or lowered using hydraulic cylinder 206 to simultaneously rotate the IMU 218 that is coupled to the dozer blade 204 and the IMU 220 that is coupled to the c-frame 222. Such a movement would change a pitch of the IMU 220 coupled to the c-frame 222 and a pitch and/or roll of the IMU coupled to the dozer blade 204 depending on the yaw of the dozer blade 204 relative to the c-frame 222. Referring to FIG. 4A-4B, raising or lowering the c-frame may only cause a change in pitch of the dozer blade if the measurement axes of both IMUs are aligned at the time of the movement as shown in FIG. 4A. Raising or lowering the c-frame may cause a change in both pitch and roll of the dozer blade if the measurement axes of the IMUs are not aligned at the time of the movement as shown in FIG. 4B.

The method also includes receiving gyro signals of the IMU coupled to the dozer blade, where at least some of the gyro signals of the IMU coupled to the dozer blade include signals obtained while the c-frame is moving (508). The gyro signals capture the change in pitch and/or roll of the dozer blade caused by the movement in step (506).

The method also includes receiving gyro signals of the IMU coupled to the c-frame, where at least some of the gyro signals of the IMU coupled to the c-frame include signals obtained while the c-frame is moving (510). The gyro signals capture the change in the pitch of the c-frame caused by the movement in step (506).

For embodiments that include receiving an estimated pitch and roll of the dozer blade and c-frame in steps (502) and (504) above, the method may also include reducing effects of the estimated pitch and roll of the dozer blade on the gyro signals of the IMU coupled to the dozer blade to provide corrected dozer blade gyro signals (512), and reducing effects of the estimated pitch and roll of the c-frame on the gyro signals of the IMU coupled to the c-frame to provide corrected c-frame gyro signals (514). In an embodiment, the effects of the estimated pitch and roll may be reduced by mapping the gyro signals of the IMU coupled to the dozer blade and the gyro signals of the IMU coupled to the c-frame to an approximately level plane. The mapping is determined based on the estimated pitch and roll of the dozer blade and c-frame. Mapping the gyro signals to a rotational level plane can allow a more accurate estimation of the relative yaw of the dozer blade.

The method also includes estimating the yaw of the dozer blade relative to the c-frame based on the corrected dozer blade gyro signals and the corrected c-frame gyro signals (516). The movement of the c-frame in step 506 changes a rotation (or angular velocity) of the pitch of the c-frame and the pitch and/or roll of the dozer blade. Any difference between the gyro signals during the movement is due to a difference in the yaw of the dozer blade relative to the c-frame (or difference in the yaw of the IMU coupled to the dozer blade compared to a yaw of the IMU coupled to the c-frame).

The yaw may be determined from the gyro signals using any of a number of different analytical techniques. Merely as an example, in some embodiments the relative yaw may be determined by calculating:

$$Yaw = D - DB \qquad \text{Equation (1)}$$

where D is the inverse tangent of roll rate/pitch rate for the dozer, and DB is the inverse tangent of the roll rate/pitch rate for the dozer blade as shown by the following equations:

$$D = a\tan(D_{RR}/D_{PP}) \qquad \text{Equation (2)}$$

$$DB = a\tan(DB_{RR}/DB_{PR}) \qquad \text{Equation (3)}$$

where $D_{RR}$ is the roll rate of the dozer, $D_{PR}$ is the pitch rate of the dozer, $DB_{RR}$ is the roll rate of the dozer blade, and $DB_{PR}$ is the pitch rate of the dozer blade. Since the yaw is not changing during the movement, and assuming the measurement axes of the IMUs are approximately aligned at some reference orientation, the gyro signals will be different in pitch and roll only.

In some embodiments, the gyro signals from the IMUs provide angular velocity in Cartesian reference frames, and the relative yaw is estimated using Euler angles.

The method illustrated in the flowchart of FIG. 5 provides an estimation of the yaw while the dozer blade is static (the yaw is not changing). In an embodiment, a change in the yaw of the dozer blade may also be tracked. The yaw of the dozer blade relative to the c-frame may be estimated using the method illustrated in FIG. 5. Subsequent changes in yaw may be tracked by receiving gyro signals of the IMU coupled to the dozer blade and gyro signals of the IMU coupled to the c-frame while the dozer blade and/or c-frame are rotating. The yaw of the dozer blade relative to the c-frame is estimated based on the gyro signals received while the dozer blade is rotating. The gyro signals provide angular velocities of the dozer blade and c-frame during rotation, and the yaw may be tracked by integrating the angular velocities in accordance with known techniques.

As explained previously, the dozer and dozer blade are used in this specification as examples of separate bodies that have a semi-rigid coupling between them. The embodiments described herein are not, however, limited to the dozer and dozer blade examples and may be utilized with any rigid bodies having a semi-rigid coupling between them. As another example, the embodiments described herein may be used with excavators (or backhoes) to determine the yaw of a bucket relative to a stick (or dipper) or relative to a body of the excavator.

Figure 6:
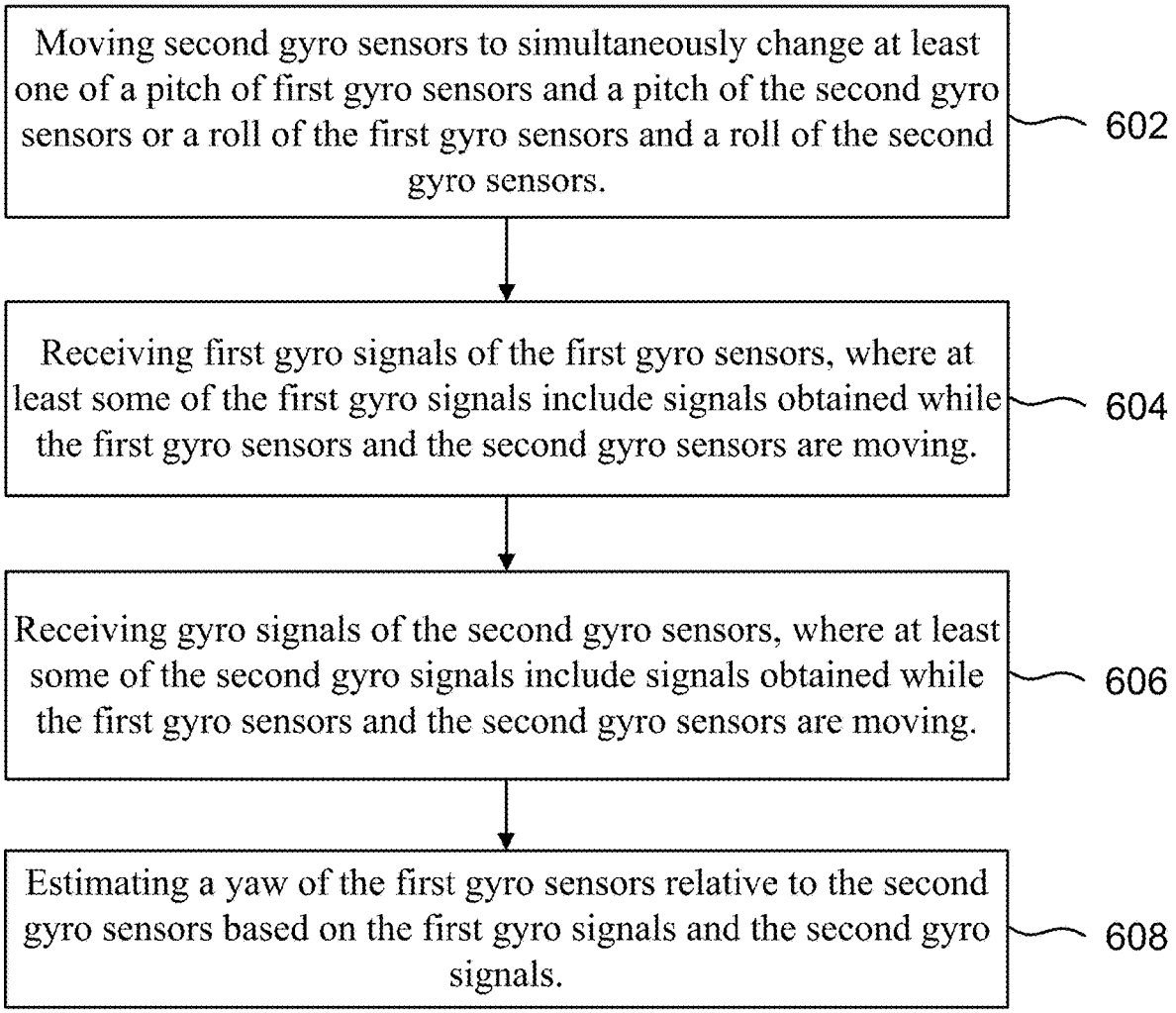
FIG. 6 is a flowchart of an exemplary method for estimating yaw of first gyro sensors relative to second gyro sensors in accordance with an embodiment.

FIG. 6 is a flowchart of an exemplary method for estimating yaw of first gyro sensors relative to second gyro sensors in accordance with an embodiment. The first gyro sensors and the second gyro sensors are mounted on separate bodies having a semi-rigid coupling between them so that a change in pitch or roll of the second gyro sensors will result in a corresponding change in pitch or roll of the first gyro sensors, and the first gyro sensors are rotatable to change the yaw of the first gyro sensors relative to the second gyro sensors. In some embodiments, the first gyro sensors may be coupled to an implement and the second gyro sensors may be coupled to a machine.

The method includes moving the second gyro sensors to simultaneously change at least one of the pitch of the first gyro sensors and the pitch of the second gyro sensors or the roll of the first gyro sensors and the roll of the second gyro sensors (602). Measurement axes of the first gyro sensors and the second gyro sensors may be approximately aligned at a reference orientation.

The method also includes receiving first gyro signals of the first gyro sensors, where at least some of the first gyro signals include signals obtained while the first gyro sensors and the second gyro sensors are moving (604). The yaw of the first gyro sensors is static (or not changing) during the movement.

The method also includes receiving second gyro signals of the second gyro sensors, where at least some of the second gyro signals include signals obtained while the first gyro sensors and the second gyro sensors are moving (606).

The method also includes estimating the yaw of the first gyro sensors relative to the second gyro sensors based on the first gyro signals and the second gyro signals (608).

In an embodiment, the method also includes receiving an estimated pitch and roll of the first gyro sensors, receiving an estimated pitch and roll of the second gyro sensors, reducing effects of the estimated pitch and roll of the first gyro sensors on the first gyro signals to provide first corrected gyro signals, and reducing effects of the estimated pitch and roll of the second gyro sensors on the second gyro signals to provide second corrected gyro signals. The first gyro signals used to estimate the yaw may be the first corrected gyro signals, and the second gyro signals used to estimate the yaw may be the second corrected gyro signals. In some embodiments, the pitch and roll of the first gyro sensors are estimated using a first IMU, and the pitch and roll of the second gyro sensors are estimated using a second IMU. In other embodiments, at least one of the pitch and roll of the first gyro sensors or the pitch and roll of the second gyro sensors are estimated without using signals from an IMU.

Figure 7:
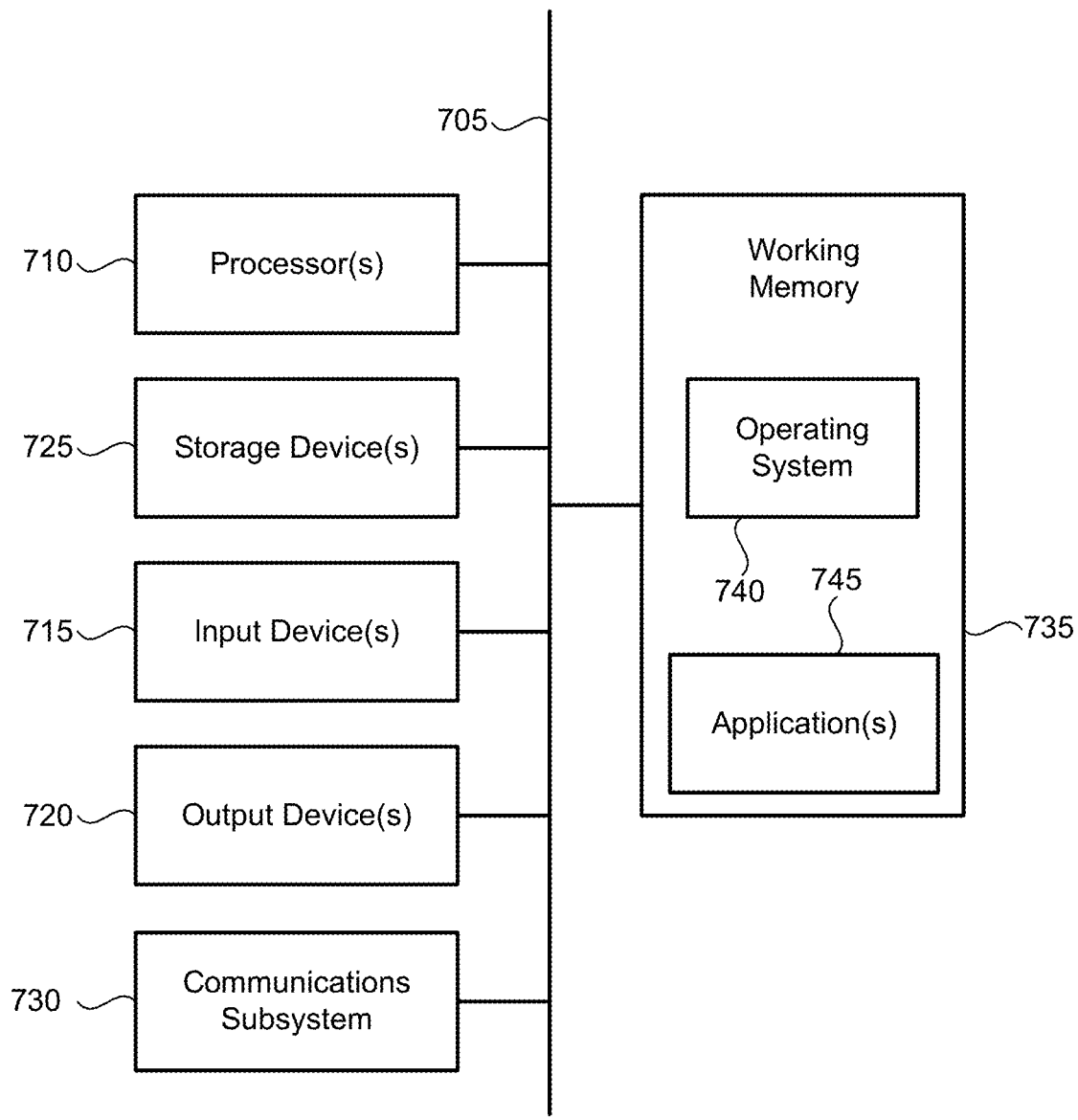
FIG. 7 illustrates a simplified computer system in accordance with an embodiment.

FIG. 7 illustrates a simplified computer system 700, according to some embodiments of the present disclosure. Computer system 700 as illustrated in FIG. 7 may be incorporated into dozers 102, 202, 302, or other machines. FIG. 7 provides a schematic illustration of one embodiment of computer system 700 that can perform some or all of the steps of the methods provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or more integrated manner.

Computer system 700 is shown comprising hardware elements that can be electrically coupled via a bus 705, or may otherwise be in communication, as appropriate. The hardware elements may include one or more processors 710, including without limitation one or more general-purpose processors and/or one or more special-purpose processors such as digital signal processing chips, graphics acceleration processors, and/or the like; one or more input devices 715, which can include, without limitation a mouse, a keyboard, a camera, and/or the like; and one or more output devices 720, which can include, without limitation a display device, a printer, and/or the like.

Computer system 700 may further include and/or be in communication with one or more non-transitory storage devices 725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 700 might also include a communications subsystem 730, which can include, without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 730 may include one or more input and/or output communication interfaces to permit data to be exchanged with a network such as the network described below to name one example, to other computer systems, and/or any other devices described herein (e.g., IMUs). Depending on the desired functionality and/or other implementation concerns, a portable electronic device or similar device may communicate image and/or other information via the communications subsystem 730. In other embodiments, a portable electronic device, e.g. the first electronic device, may be incorporated into computer system 700, e.g., an electronic device as an input device 715. In some embodiments, computer system 700 will further comprise a working memory 735, which can include a RAM or ROM device, as described above.

Computer system 700 also can include software elements, shown as being currently located within the working memory 735, including an operating system 740, device drivers, executable libraries, and/or other code, such as one or more application programs 745, which may comprise computer programs provided by various embodiments, and/ or may be designed to implement methods, and/or configure systems, provided by other embodiments, as described herein. Merely by way of example, one or more procedures described with respect to the methods discussed above can be implemented as code and/or instructions executable by a computer and/or a processor within a computer: in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 725 described above. In some cases, the storage medium might be incorporated within a computer system, such as computer system 700. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 700 and/or might take the form of source and/or installable code, which, upon compilation and/or installation on computer system 700 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware or software including portable software, such as applets, etc., or both. Further, connection to other computing devices such as network input/output devices may be employed.

As mentioned above, in one aspect, some embodiments may employ a computer system such as computer system 700 to perform methods in accordance with various embodiments of the technology. According to a set of embodiments, some or all of the procedures of such methods are performed by computer system 700 in response to processor 710 executing one or more sequences of one or more instructions, which might be incorporated into the operating system 740 and/or other code, such as an application program 745, contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein. Additionally or alternatively, portions of the methods described herein may be executed through specialized hardware.

The terms "machine-readable medium" and "computer-readable medium." as used herein, refer to any medium that participates in providing data that causes a machine to operate in a specific fashion. In an embodiment implemented using computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 700.

The communications subsystem 730 and/or components thereof generally will receive signals, and the bus 705 then might carry the signals and/or the data, instructions, etc. carried by the signals to the working memory 735, from which the processor(s) 710 retrieves and executes the instructions. The instructions received by the working memory 735 may optionally be stored on a non-transitory storage device 725 either before or after execution by the processor(s) 710.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method for estimating yaw of a dozer blade coupled to a dozer by a c-frame, wherein the dozer blade is rotatable to change the yaw of the dozer blade relative to the c-frame, the method comprising:
   receiving an estimated pitch and roll of the dozer blade;
   receiving an estimated pitch and roll of the c-frame;
   moving the c-frame to simultaneously rotate an inertial measurement unit (IMU) coupled to the dozer blade and an IMU coupled to the c-frame, wherein measurement axes of the IMU coupled to the dozer blade and measurement axes of the IMU coupled to the c-frame are approximately aligned;
   receiving gyro signals of the IMU coupled to the dozer blade, wherein at least some of the gyro signals of the IMU coupled to the dozer blade include signals obtained while the c-frame is moving and the yaw of the dozer blade is substantially static;
   receiving gyro signals of the IMU coupled to the c-frame, wherein at least some of the gyro signals of the IMU coupled to the c-frame include signals obtained while the c-frame is moving;
   reducing effects of the estimated pitch and roll of the dozer blade on the gyro signals of the IMU coupled to the dozer blade to provide corrected dozer blade gyro signals;
   reducing effects of the estimated pitch and roll of the c-frame on the gyro signals of the IMU coupled to the c-frame to provide corrected c-frame gyro signals; and
   estimating the yaw of the dozer blade relative to the c-frame based on the corrected dozer blade gyro signals and the corrected c-frame gyro signals;
   wherein the gyro signals of the IMU coupled to the dozer blade and the gyro signals of the IMU coupled to the c-frame provide information on angular velocity of the dozer blade and angular velocity of the c-frame, respectively.

2. The method of claim 1, wherein the pitch and roll of the dozer blade is estimated using the IMU coupled to the dozer blade, and the pitch and roll of the c-frame is estimated using the IMU coupled to the c-frame.

3. The method of claim 1, wherein at least one of the pitch and roll of the dozer blade or the pitch and roll of the c-frame are estimated without using signals from an IMU.

4. The method of claim 1, wherein the yaw of the dozer blade relative to the c-frame is estimated using Euler angles.

5. The method of claim 1, further comprising:
   rotating the dozer blade to change the yaw of the dozer blade;
   receiving gyro signals of the IMU coupled to the dozer blade while the dozer blade is rotating; and
   estimating the yaw of the dozer blade relative to the c-frame based on the gyro signals received while the dozer blade is rotating.

6. The method of claim 1, wherein the information on angular velocity of the dozer blade and angular velocity of the c-frame is provided in Cartesian reference frames.

7. The method of claim 1, wherein the measurement axes of the IMU coupled to the dozer blade and the measurement axes of the IMU coupled to the c-frame each include an axis associated with pitch and an axis associated with roll, and wherein the gyro signals of the IMU coupled to the dozer blade and the gyro signals of the IMU coupled to the c-frame provide information on angular velocity associated with the pitch and angular velocity associated with the roll.

8. The method of claim 1, wherein the measurement axes of the IMU coupled to the dozer blade and the measurement axes of the IMU coupled to the c-frame each include an axis associated with pitch, an axis associated with roll, and an axis associated with yaw, and wherein the yaw of the dozer blade relative to the c-frame is estimated using gyro signals associated with the pitch and gyro signals associated with the roll without using gyro signals associated with the yaw.

9. The method of claim 1, wherein the effects of the estimated pitch and roll of the dozer blade are reduced by mapping the gyro signals of the IMU coupled to the dozer blade to an approximately level plane.

10. A system for estimating yaw of an implement coupled to a machine, wherein the implement is rotatable to change the yaw of the implement relative to the machine, the system comprising:
    a first gyro sensor coupled to the implement;
    a second gyro sensor coupled to the machine, wherein the machine is configured so that movement of at least a portion of the machine simultaneously changes at least one of a pitch of the first gyro sensor and a pitch of the second gyro sensor or a roll of the first gyro sensor and a roll of the second gyro sensor; and
    a computer system communicatively coupled to the first gyro sensor and to the second gyro sensor, the computer system configured to:
    receive gyro signals of the first gyro sensor, wherein at least some of the gyro signals of the first gyro sensor include signals obtained while at least the portion of the machine is moving and the yaw of the implement is substantially static;
    receive gyro signals of the second gyro sensor, wherein at least some of the gyro signals of the second gyro sensor include signals obtained while at least the portion of the machine is moving;
    estimate the yaw of the implement relative to the machine based on the gyro signals of the first gyro sensor and the gyro signals of the second gyro sensor;

reduce effects of an estimated pitch and roll of the implement on the gyro signals of the first gyro sensor to provide first corrected gyro signals; and reduce effects of an estimated pitch and roll of the machine on the gyro signals of the second gyro sensor to provide second corrected gyro signals, wherein the gyro signals of the first gyro sensor used to estimate the yaw of the implement relative to the machine are the first corrected gyro signals, and the gyro signals of the second gyro sensor used to estimate the yaw of the implement relative to the machine are the second corrected gyro signals.

11. The system of claim 10, wherein the implement is a dozer blade and the machine is a dozer that includes a c-frame coupled to the dozer blade, and wherein the second gyro sensor is coupled to the c-frame.

12. The system of claim 10, wherein measurement axes of the first gyro sensor and measurement axes of the second gyro sensor are approximately aligned.

13. The system of claim 10, wherein the first gyro sensor is coupled to the implement at a known orientation relative to the second gyro sensor coupled to the machine.

14. A method for estimating yaw of first gyro sensors relative to second gyro sensors, wherein the first gyro sensors and the second gyro sensors are mounted on separate bodies having a semi-rigid coupling so that a change in pitch or roll of the second gyro sensors results in a corresponding change in pitch or roll of the first gyro sensors, and the first gyro sensors are rotatable to change the yaw of the first gyro sensors relative to the second gyro sensors, the method comprising:

moving the second gyro sensors to simultaneously change at least one of the pitch of the first gyro sensors and the pitch of the second gyro sensors or the roll of the first gyro sensors and the roll of the second gyro sensors;

receiving first gyro signals of the first gyro sensors, wherein at least some of the first gyro signals include signals obtained while the first gyro sensors and the second gyro sensors are moving and the yaw of the first gyro sensors is substantially static;

receiving second gyro signals of the second gyro sensors, wherein at least some of the second gyro signals include signals obtained while the first gyro sensors and the second gyro sensors are moving; and estimating the yaw of the first gyro sensors relative to the second gyro sensors based on the first gyro signals and the second gyro signals.

15. The method of claim 14, wherein measurement axes of the first gyro sensors and measurement axes of the second gyro sensors are approximately aligned.

16. The method of claim 14, further comprising:
receiving an estimated pitch and roll of the first gyro sensors;
receiving an estimated pitch and roll of the second gyro sensors;
reducing effects of the estimated pitch and roll of the first gyro sensors on the first gyro signals to provide first corrected gyro signals; and
reducing effects of the estimated pitch and roll of the second gyro sensors on the second gyro signals to provide second corrected gyro signals, wherein the first gyro signals used to estimate the yaw are the first corrected gyro signals, and the second gyro signals used to estimate the yaw are the second corrected gyro signals.

17. The method of claim 16, wherein the pitch and roll of the first gyro sensors are estimated using a first inertial measurement unit (IMU), and the pitch and roll of the second gyro sensors are estimated using a second IMU.

18. The method of claim 16, wherein at least one of the pitch and roll of the first gyro sensors or the pitch and roll of the second gyro sensors are estimated without using signals from an IMU.

19. The method of claim 14, wherein the first gyro sensors are mounted to an implement and the second gyro sensors are mounted on a machine.

* * * * *